(No Model.)  5 Sheets—Sheet 1.
H. HILDE.
GLASS BLOWING APPARATUS.
No. 493,867. Patented Mar. 21, 1893.
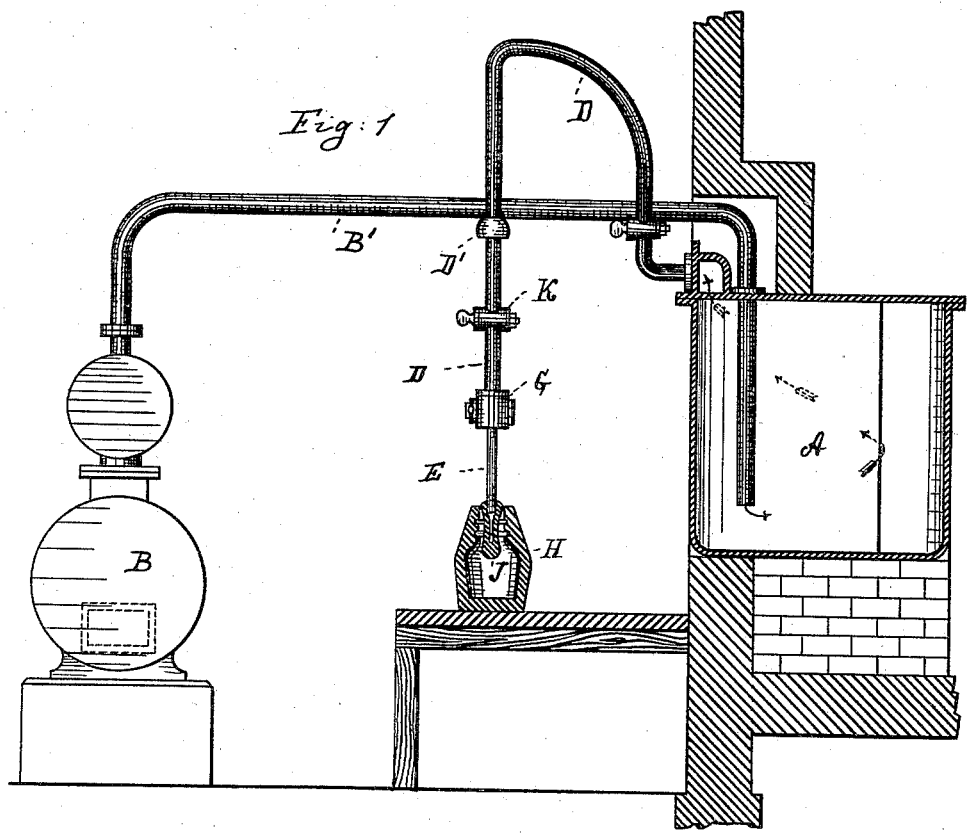
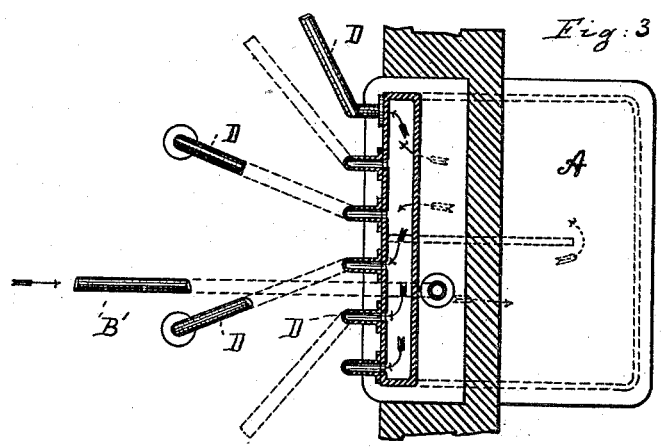
Witnesses:
Wm Wagner
A. Jonghmans
Inventor:
H. Hilde
by his attorneys
Roeder & Brieau (No Model.) 5 Sheets—Sheet 2.
H. HILDE.
GLASS BLOWING APPARATUS.
No. 493,867. Patented Mar. 21, 1893.
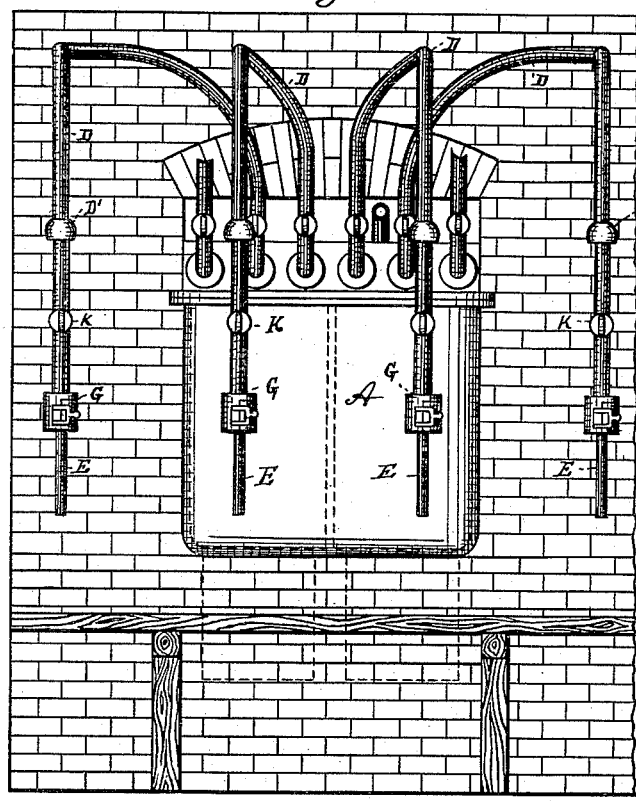
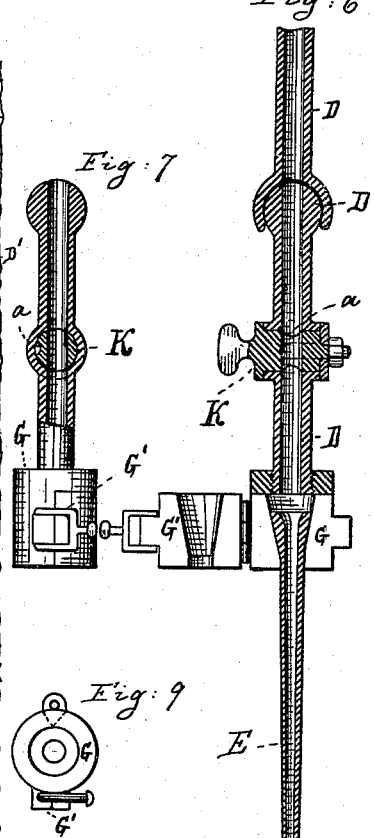
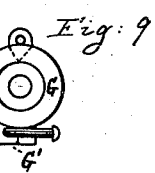
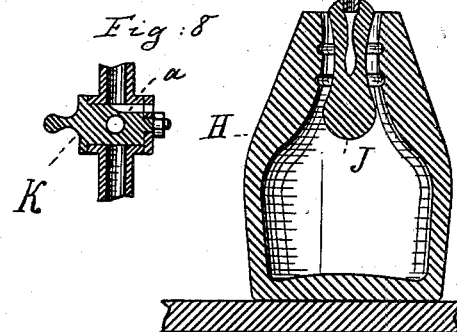
Witnesses:
Wm. Wagner
A. Jonghmans
Inventor:
H. Hilde
by his attorneys
Roeder & Briesen (No Model.)  
5 Sheets—Sheet 3.

H. HILDE.
GLASS BLOWING APPARATUS.

No. 493,867.  Patented Mar. 21, 1893.

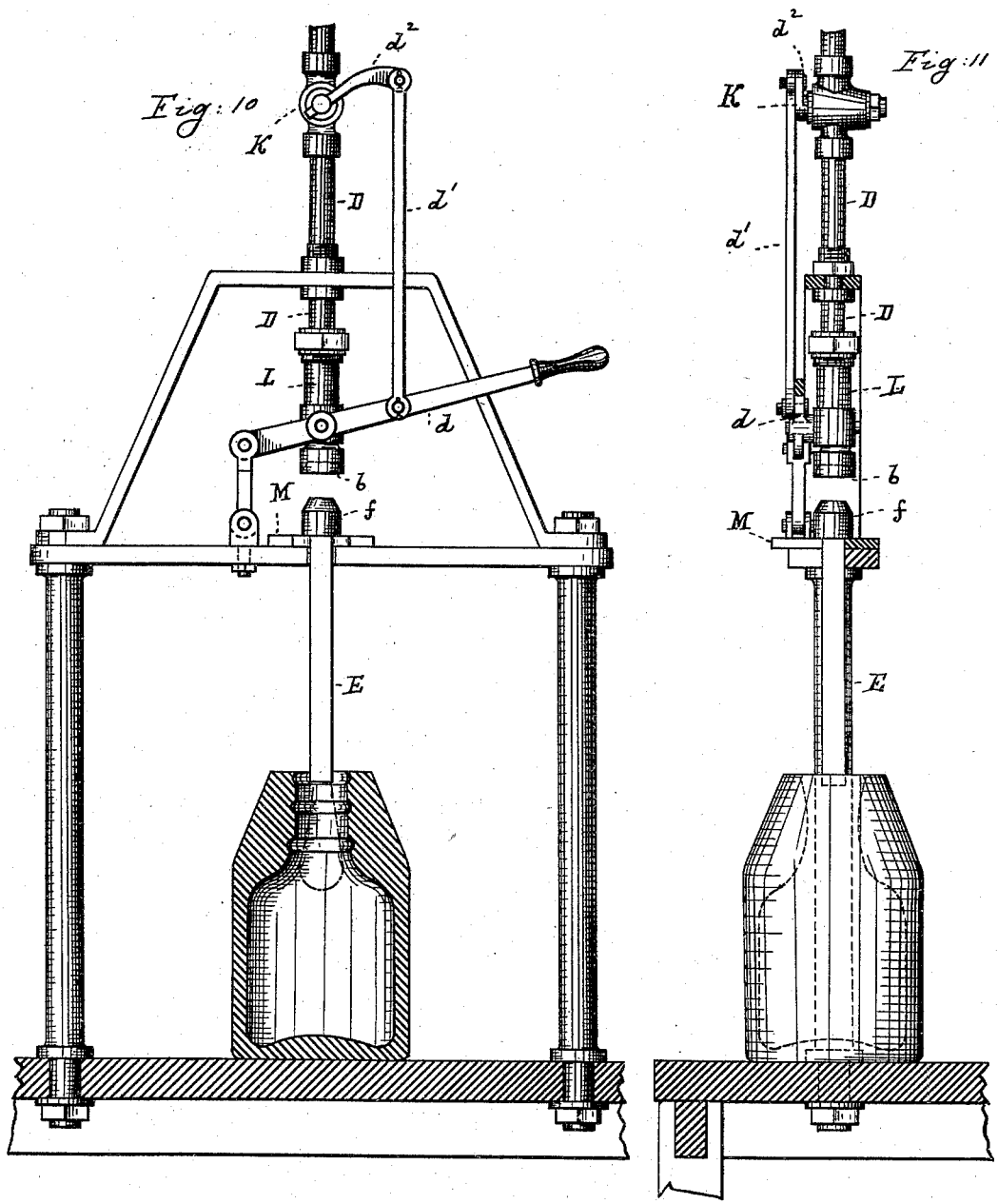

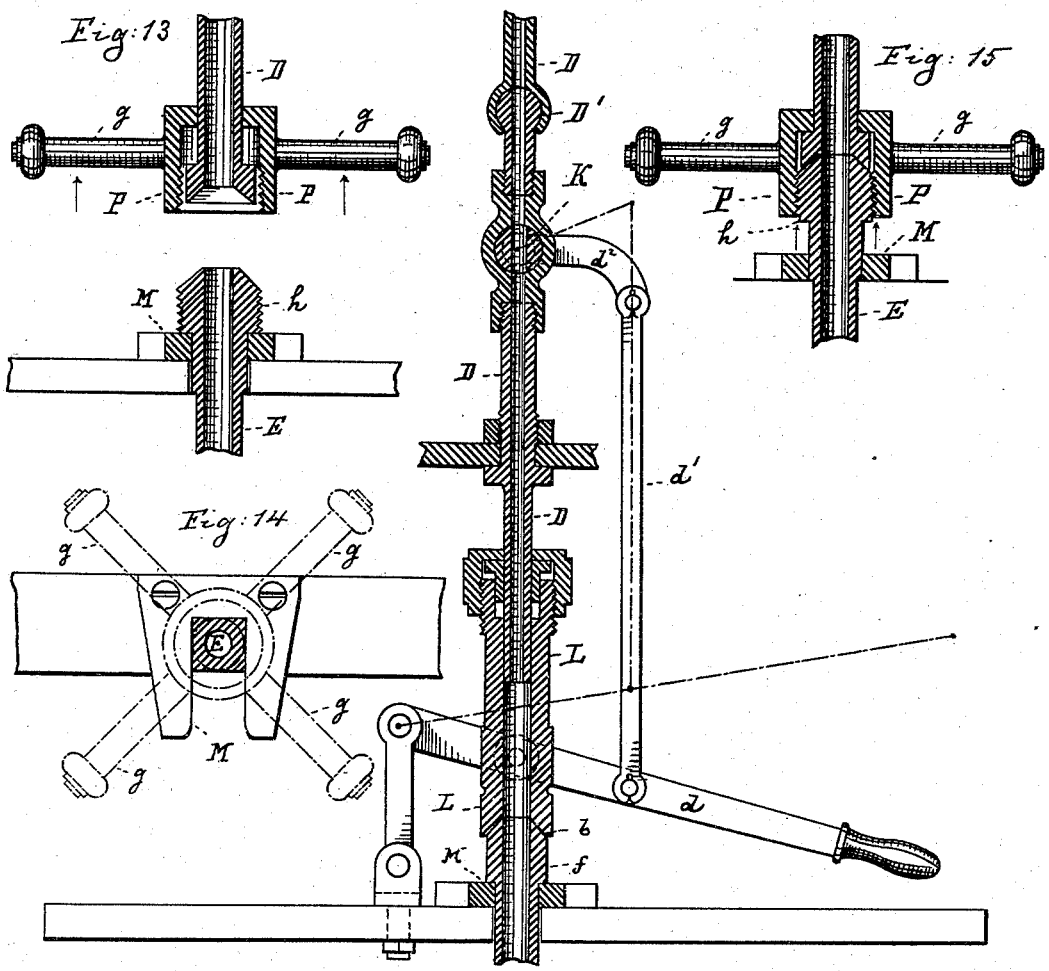

United States Patent Office.

HERMANN HILDE, OF ROSSWEIN, GERMANY.

GLASS-BLOWING APPARATUS.

SPECIFICATION forming part of Letters Patent No. 493,867, dated March 21, 1893.

Application filed September 9, 1890. Serial No. 364,446. (No model.)

*To all whom it may concern:*

Be it known that I, HERMANN HILDE, of Rosswein, in the Kingdom of Saxony, Germany, have invented a new and useful Improvement in Glass-Blowing Apparatus, of which the following is a specification.

This invention relates to a furnace for glass blowers, in which compressed and also heated air is forced into the pear of glass formed on the blow tube. In this way, the glass while still hot and pliable is forced against the wall of the mold and thus a sharp, clean impression may be obtained.

The invention consists in the various features of improvement more fully pointed out in the claims.

Figure 4:
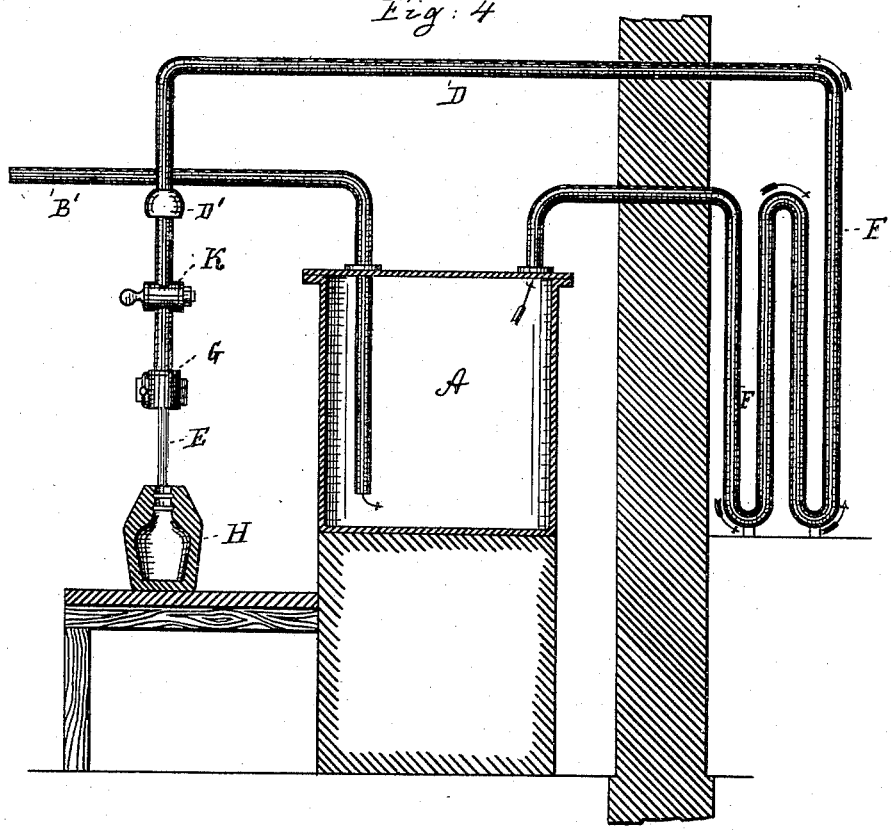
Figure 5:
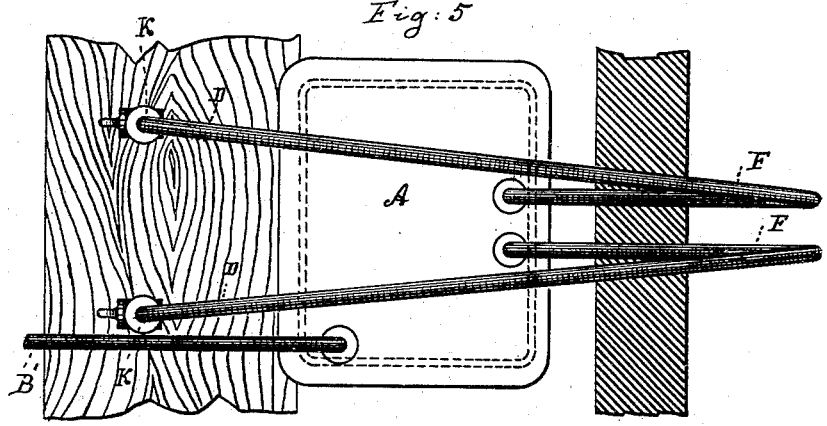

In the accompanying drawings: Figure 1 is a sectional elevation of my improved glass blowers' furnace; Fig. 2 a front view thereof; Fig. 3 a horizontal section thereof; Fig. 4 a sectional elevation of a modification; Fig. 5 a top view thereof; Fig. 6 a vertical section through tube D, and through the blow tube and mold; Fig. 7 a longitudinal section through tube D, at right angles to Fig. 6; Fig. 8 a cross section through cock K; Fig. 9 a top view of joint G; Fig. 10 a front elevation of a modification of the joint, showing it disconnected from the blow tube; Fig. 11 a side view thereof; Fig. 12 a vertical section thereof showing it connected to the blow tube; Fig. 13 a vertical section through a further modification of the joint showing the blow tube disconnected; Fig. 14 a plan partly in section thereof and Fig. 15 a vertical section thereof showing the blow tube connected.

In Fig. 1 the letter B, represents an air pump for forcing compressed air through tube B', into an accumulator or heating chamber A, of a suitable furnace. Here the air is highly heated and is thence conducted through one or more tubes D, to the blow tube or tubes E. The connection between the delivery tube D, and the blow tube E, should be such, that the latter may be readily detached from and attached to the former. To this effect, the tube D, is preferably jointed as at D', and is provided at its lower end with a coupling G, adapted to be readily attached to the blow tube (Figs. 6-9). The tube D, is provided with a cock K, having a laterally extending outwardly opening channel $a$, through which the hot air is discharged when the cock is closed by means of an opening in the cock plug (Fig. 8).

The coupling G, consists of a box having a tapped upper end by which it is fitted upon the lower threaded end of tube D. The lower section of coupling G, is provided with a door G', and with a concave bore or opening for tightly grasping and holding the upper tapering end of blow tube E.

In use, the glass blower forms a pear of glass J, upon blow tube E, and quickly introduces such tube into the mold H, and couples it to tube D. Next the cock K, is opened and the heated and compressed air is admitted into the glass bulb so that the latter is pressed tightly against the mold. The glass will thus remain soft and thin and a sharp contour may be readily obtained. After the blowing out of the glass bulb has been completed, the cock K, is closed and the heated and compressed air from the bulb is allowed to escape through channel $a$.

In Figs. 4 and 5 a coil F, is interposed between the delivery tube D and the chamber A. In this case, the chamber A, serves only as an accumulator, while the air is heated in the coil.

In Figs. 10-12, the lower end of delivery tube D, is embraced by a sliding or telescoping tube L. This tube L, is provided with a socket or seat $b$, at its end, fitting over the head $f$, of blow tube E. By means of head $f$, the blow tube is suspended from a forked plate M.

The tube L, may be raised or lowered by a lever $d$, connected also by link $d'$, and lever $d^2$, to the cock K. Thus when the tube L, is lowered and connected to the blow tube E, the air cock K, is simultaneously opened, while when the tube L, is raised the cock is closed.

In Figs. 13-15 the blow tube E, has a threaded head $h$, and an angular cross section beneath the head. Here it is embraced and rigidly held by the fork M, which is provided with a corresponding angular opening.

A sliding nut or threaded socket P, embraces the lower end of tube D, and may be revolved by handles $g$. The tapped opening of this nut, fits over the threaded head $h$, of the blow tube. Thus it will be seen, that by revolving the nut, the blow tube may be readily coupled to or uncoupled from the delivering tube.

What I claim is—

1. The combination of an air compressor and accumulator with a delivery tube D having cock K, a telescoping tube L having socket $b$, a blow tube E, over which the telescoping tube is adapted to be projected, and with levers $d$, $d^2$ and link $d'$ for simultaneously operating the cock and the telescoping tube, substantially as specified.

2. The combination of an air compressor and accumulator with a delivery tube D, a threaded socket P upon such tube, a blow tube E having threaded head $h$ and an angular shoulder beneath such head and with a fork M, that embraces the shoulder, substantially as specified.

In testimony whereof I have signed my name to this specification in the presence of two subscribing witnesses.

HERMANN HILDE.

Witnesses:
MAX MATTHÄI,
CARL BORNGRAEBER.